US006816067B2

(12) United States Patent
Patton

(10) Patent No.: US 6,816,067 B2
(45) Date of Patent: Nov. 9, 2004

(54) APPARATUS AND METHOD FOR SELECTING WIRELESS DEVICES

(75) Inventor: David B. Patton, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 661 days.

(21) Appl. No.: 09/771,816

(22) Filed: Jan. 29, 2001

(65) Prior Publication Data

US 2002/0101343 A1 Aug. 1, 2002

(51) Int. Cl.[7] .............................................. G08B 26/00
(52) U.S. Cl. ...................... 340/505; 340/502; 340/504; 340/313
(58) Field of Search ............................... 340/502, 504, 340/505, 7.22, 10.1, 313, 314, 331, 332, 539.32

(56) References Cited

U.S. PATENT DOCUMENTS

| | | |
|---|---|---|
| 4,348,666 A | 9/1982 | Ogita |
| 4,965,548 A | 10/1990 | Fayfield |
| 5,513,246 A | 4/1996 | Jonsson et al. |
| 5,604,923 A | 2/1997 | Wilkus |
| 5,613,232 A | 3/1997 | Toshida et al. |
| 5,923,288 A | 7/1999 | Pedlow, Jr. |
| 6,127,936 A | 10/2000 | Gendel et al. |
| 6,297,737 B1 * | 10/2001 | Irvin .......................... 340/571 |
| 6,366,202 B1 * | 4/2002 | Rosenthal .............. 340/539.32 |

OTHER PUBLICATIONS

David Harvey, "Setting Up Your Ricochet Modem for the First Time", Apr. 27, 2000, pp. 1–4.

* cited by examiner

Primary Examiner—Daryl Pope
(74) Attorney, Agent, or Firm—Charles F. Moore

(57) ABSTRACT

A method and apparatus for identifying and selecting a desired wireless device from multiple available wireless devices is provided. In one embodiment, the desired wireless device receives a signal from a searching wireless device. An indicator on the desired wireless device is activated in a unique identification pattern that may be recognized by the user of the searching wireless device. In this manner the user may verify that the desired wireless device is receiving the signal from the searching wireless device.

18 Claims, 2 Drawing Sheets

APPARATUS AND METHOD FOR SELECTING WIRELESS DEVICES

TECHNICAL FIELD

The present invention relates generally to methods and apparatus for verifying the location of wireless devices and, more particularly, to methods and apparatus for identifying and selecting a desired wireless device from multiple available wireless devices.

BACKGROUND

Wireless connectivity between electronic devices is becoming increasingly widespread. Some wireless connectivity protocols, such as Bluetooth™ wireless technology, allow multiple electronic devices to be wirelessly networked together. Such devices may include desktop computers, mobile computers, printers, personal digital assistants (PDAs), mobile phones, pagers, headphones, speakers, etc. Each device in the network may communicate with other devices through point-to-point or point-to-multipoint connections.

Wireless networks may include two, three or more devices. In such a network, when the user of a first wireless device, such as a PDA, wants to connect to another wireless device, such as a printer, the user must first identify and select the desired device. The user may cause the PDA to search the wireless network and list all networked devices it finds. Each device may be listed with an assigned name or other identifier. If the user can match the listed name or identifier to the desired device, then the user selects that device. However, the user may be unfamiliar with the devices in this network, or one or more devices may not be listed with an identifier. Even if the user recognizes and selects the desired device, the user may desire to confirm that the user's device is communicating with the desired device.

One method of obtaining this confirmation is to convey information from the selected or desired wireless device to the user. In the field of printers, for example, a number of techniques and features are utilized to convey printer status information to a user. Many printers include one or more indicator lights on an outer portion or control panel of the printer. For example, the DeskJet®970 color inkjet printer, produced by Hewlett-Packard Co. of Palo Alto, Calif., utilizes three LED (light emitting diode) indicators on a control panel. A Print Cartridge Status LED flashes to indicate that one or more print cartridges are low on ink, improperly installed or malfunctioning. A Resume LED flashes to prompt the user to press a resume button to continue printing. A Power LED indicates that the printer is on and flashes when the printer is processing information.

Some more expensive printers, such as the Color LaserJet®4500 printer also produced by Hewlett-Packard Co., include an LCD (liquid crystal display) or other type of display mounted on the printer that generates messages to the user. However, these displays are costly and add manufacturing complexity to the product, making them ill-suited for a low-cost consumer printer.

Particularly for low-cost consumer printers and other inexpensive wireless devices, it would be desirable to convey wireless connection information through existing features or additional inexpensive features. Thus, what is needed is a method and apparatus for verifying that a first wireless device is communicating with a second wireless device, with the method utilizing existing or additional but inexpensive features of the devices.

SUMMARY OF THE INVENTION

The present invention overcomes or reduces the disadvantages of the prior art by providing a method and apparatus for identifying and selecting a desired wireless device from multiple available wireless devices. In one embodiment, the desired wireless device receives a signal from a searching wireless device. An indicator on the desired wireless device is then activated in a unique identification pattern that may be recognized by the user of the searching wireless device to verify that the desired wireless device is receiving the signal from the searching wireless device.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
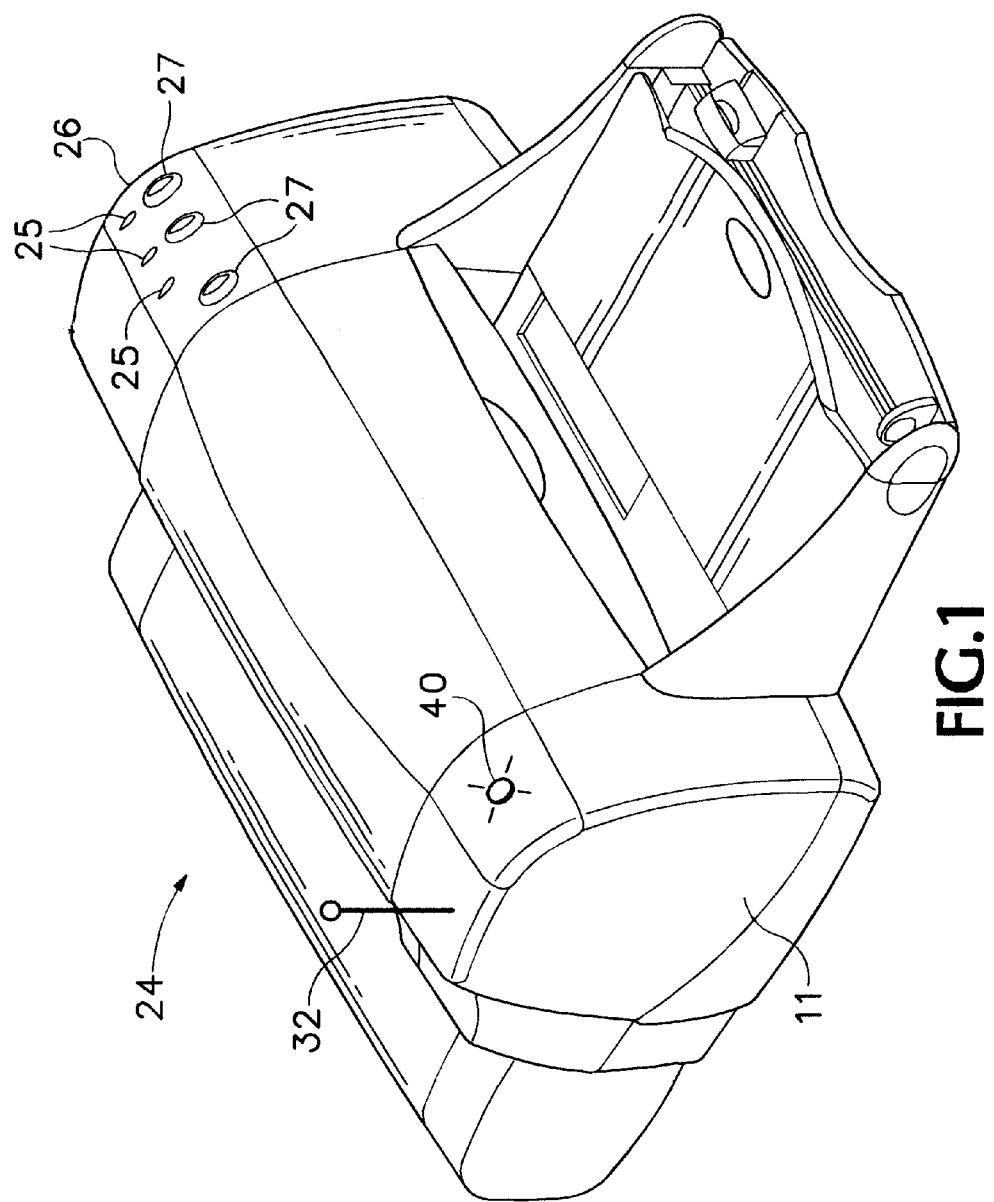
FIG. 1 is a perspective view of a printer that utilizes the methods and apparatus of the present invention.

FIG. 1 illustrates an embodiment of a printer 24 that utilizes the methods and apparatus of the present invention. It will be appreciated that the present invention may be practiced with a wide variety of electronic devices that are capable of communicating over a wireless network. For example, such devices may include desktop computers, mobile computers, printers, personal digital assistants (PDAs), mobile phones, pagers, headphones, speakers, etc. To facilitate description, the concepts of the present invention are described in the environment of a wireless network that includes two printers and a PDA. The present invention also may be practiced with two electronic devices or with four or more electronic devices that communicate over a wireless network.

As described above, and with reference to FIG. 2, in a small-scale wireless network 16 the user of a first wireless device, such as a PDA 20, may desire to connect to another wireless device, such as the printer 24. The wireless network 16 may also include one or more additional wireless devices, such as a second printer 28. The PDA 20 and printers 24 and 28 each include an antenna 30, 32, 34, respectively, for transmitting and receiving signals over the wireless network 16. Such signals may comprise radio waves of various frequencies, such as a Bluetooth™-compatible 2.45 GHz frequency radio signal.

To connect to a desired device, the user of the PDA 20 must first identify and select the desired device with which the user would like to connect. The user may cause the PDA 20 to search the wireless network 16 and list all networked devices it finds. Each device may be listed with an assigned name or other identifier. If the user can match the listed name or identifier to the desired device, then the user selects that name or identifier on the PDA 20. However, the user may be unfamiliar with the devices in this network, or one or more devices may not be listed with an identifier. Additionally, even where the user recognizes and selects the desired device, the user may desire to confirm that the user's device is communicating with the desired device.

With reference now to FIG. 1, and in accordance with one aspect of the present invention, the printer 24 includes an indicator 40 that broadcasts an identification pattern to verify that the printer is receiving a signal from a searching wireless device. The indicator 40 may be a visual indicator, such as a light source, or an audible indicator, such as a sound emitter. In the preferred embodiment, the indicator 40 is a low-cost, single Light Emitting Diode (LED). The printer 24 also comprises a housing 11 and a control panel 26 on the printer that includes status lights 25 and associated buttons 27 for normal printer control functions such as power on/off, resume printing and cancel printing. A controller (not shown) resides in the housing 11 and receives instructions from a host device such as a personal computer or the control panel 26. The controller includes logic that distributes control signals and generally controls the operation of the printer 24 and its various components and subsystems, including the antenna 32 and the LED indicator 40. The printer 24 also includes a computer readable memory (not shown) that is coupled to the controller. The memory may comprise any one of or a combination of a number of memory devices, including both volatile and nonvolatile memory components. These volatile and nonvolatile components may include, for example, random access memory (RAM), read-only memory (ROM), hard disk drives, floppy disk drives, compact disk drives, tape drives, and other memory components.

Figure 2:
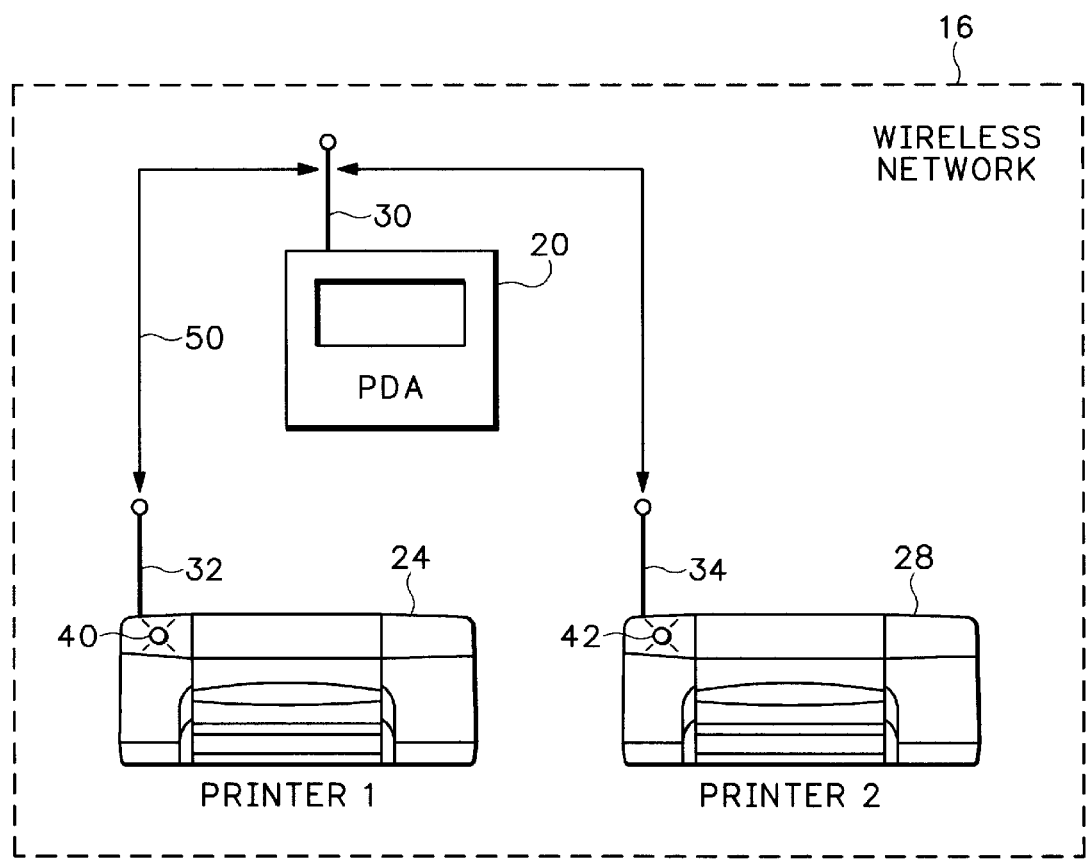
FIG. 2 is a block diagram showing a wireless network that includes two printers and a personal digital assistant.

With reference now to FIG. 2, when the printer 24 receives a signal 50 from the PDA 20, the controller activates the LED indicator 40 to broadcast an identification pattern to verify that the printer 24 is receiving the signal from the PDA. Advantageously, the user of the PDA 20 may recognize this identification pattern and thereby confirm that the printer 24 is receiving the signal 50 from the PDA 20. The identification pattern may comprise illuminating the LED indicator 40 in any of a variety of unique manners that may be recognized by the user of the PDA 20. In one embodiment, the identification pattern may comprise blinking the LED indicator 40 at a predetermined frequency, such as 4 Hz. In another embodiment, the identification pattern may comprise illuminating the LED indicator 40 at a predetermined intensity, such as 75% of full-on intensity. In another embodiment, the identification pattern may comprise illuminating the LED indicator 40 at a predetermined duty cycle, such as 60%. In another embodiment, the identification pattern may comprise illuminating the LED indicator 40 at a predetermined frequency and at a predetermined intensity. In another embodiment, the identification pattern may comprise illuminating the LED indicator 40 at a predetermined frequency and at a predetermined duty cycle. In another embodiment, the identification pattern may comprise illuminating the LED indicator 40 at a predetermined intensity and at a predetermined duty cycle. In another embodiment, the identification pattern may comprise illuminating the LED indicator 40 at a predetermined frequency, at a predetermined intensity and at a predetermined duty cycle.

The identification pattern broadcasted by the printer 24 may also coordinate to a reference pattern maintained on the PDA 20. For example, the identification pattern may comprise blinking the LED indicator 40 at a frequency of 4 Hz. Simultaneously, the PDA 20 may generate a reference pattern that simulates or corresponds to an indicator blinking at 4 Hz. For example, the PDA 20 may display an icon blinking at the same frequency of 4 Hz. The user of the PDA 20 may then match the reference pattern on the PDA to the identification pattern on the printer 24 to verify that the printer is receiving the signal from the PDA. It will be appreciated that a variety of reference patterns may be used and may correspond to the various identification patterns described above.

Additionally, a number of different identification or reference patterns may be maintained on the PDA. The user of the PDA 20 may select a desired identification pattern to be used to locate the printer 24. Alternatively, the PDA 20 may randomly select a reference pattern.

Many variations and modifications may be made to the above-described embodiment(s) of the invention without departing substantially from the spirit and principles of the invention. All such modifications and variations are intended to be included herein within the scope of the present invention.

What is claimed is:

1. A method of verifying reception of a signal by a first wireless device comprising:
   receiving a signal from a second wireless device at the first wireless device;
   activating an indicator on the first wireless device to broadcast an identification pattern to verify that the first wireless device is receiving the signal from the second wireless device; and
   coordinating the identification pattern broadcasted by the first wireless device to a reference pattern maintained on the second wireless device.

2. The method of claim 1, wherein the step of activating an indicator to broadcast an identification pattern comprises the step of illuminating a visual indicator at a predetermined blinking frequency.

3. The method of claim 1, wherein the step of activating an indicator to broadcast an identification pattern comprises the step of illuminating a visual indicator at a predetermined intensity.

4. The method of claim 1, wherein the step of activating an indicator to broadcast an identification pattern comprises the step of illuminating a visual indicator at a predetermined duty cycle.

5. The method of claim 1, wherein the step of activating an indicator to broadcast an identification pattern comprises the step of illuminating a visual indicator at a predetermined blinking frequency and at a predetermined intensity.

6. The method of claim 1, wherein the step of activating an indicator to broadcast an identification pattern comprises the step of illuminating a visual indicator at a predetermined blinking frequency and at a predetermined duty cycle.

7. The method of claim 1, wherein the step of activating an indicator to broadcast an identification pattern comprises the step of illuminating a visual indicator at a predetermined intensity and at a predetermined duty cycle.

8. The method of claim 1, wherein the step of activating an indicator to broadcast an identification pattern comprises the step of illuminating a visual indicator at a predetermined blinking frequency, at a predetermined intensity and at a predetermined duty cycle.

9. The method of claim 1, further including the step of selecting the identification pattern from a plurality of identification patterns maintained on the second wireless device.

10. The method of claim 1, wherein the first wireless device is a printer.

11. The method of claim 1, wherein the signal is a radio frequency signal.

12. The method of claim 1, wherein the indicator is a single light emitting diode.

13. The method of claim 1, wherein the indicator is a sonic emitter.

14. The method of claim 1, wherein the first wireless device and the second wireless device are linked through a wireless network.

15. A computer program embodied on a computer readable medium for verifying reception of a signal by a first wireless device comprising:
   logic to receive a signal from a second wireless device at the first wireless device;
   logic to activate an indicator on the first wireless device to broadcast an identification pattern to verify that the first wireless device is receiving the signal from the second wireless device; and
   logic to coordinate the identification pattern broadcasted by the first wireless device to a reference pattern maintained on the second wireless device.

16. A printing apparatus comprising:
   a housing;
   an antenna mounted to the housing
   an indicator mounted to the housing; and
   a controller coupled to the indicator and the antenna, the controller comprising:
   logic to receive a signal at the antenna from a wireless device; and
   logic to activate the indicator to broadcast an identification pattern to verify that the printing apparatus is receiving the signal from the wireless device.

17. The printing apparatus of claim 16, wherein the controller further comprises logic to coordinate the identification pattern broadcasted by the printing apparatus to a reference pattern maintained on the wireless device.

18. The printing apparatus of claim 16, wherein the controller further comprises logic to select the identification pattern from a plurality of identification patterns maintained on the wireless device.

* * * * *